(12) United States Patent
Moskob

(10) Patent No.: US 6,491,601 B1
(45) Date of Patent: Dec. 10, 2002

(54) ECCENTRIC TOOTHED GEARING

(75) Inventor: Frank Moskob, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/674,953

(22) PCT Filed: Oct. 28, 1999

(86) PCT No.: PCT/DE99/03455

§ 371 (c)(1),
(2), (4) Date: Dec. 18, 2000

(87) PCT Pub. No.: WO00/55523

PCT Pub. Date: Sep. 21, 2000

(30) Foreign Application Priority Data

Mar. 12, 1999  (DE) ......................... 199 10 922

(51) Int. Cl.⁷ ................................. F16H 1/32
(52) U.S. Cl. ...................................... 475/162
(58) Field of Search ................. 475/162, 168, 475/176, 177, 178, 149

(56) References Cited

U.S. PATENT DOCUMENTS

| | | | | | |
|---|---|---|---|---|---|
| 3,013,447 | A | * | 12/1961 | Hils et al. ................... | 475/162 |
| 4,228,698 | A | * | 10/1980 | Winiaszq .................... | 475/162 |
| 4,512,213 | A | * | 4/1985 | Newton ...................... | 475/162 |
| 4,994,005 | A | * | 2/1991 | Rennerfelt .................. | 475/162 |
| 5,080,638 | A | * | 1/1992 | Osborn .................... | 475/162 X |
| 5,123,883 | A | * | 6/1992 | Fukaya .................... | 475/162 X |
| 5,310,325 | A | * | 5/1994 | Gulyash ................. | 475/177 X |
| 5,479,058 | A | | 12/1995 | Seidou | |
| 5,683,323 | A | * | 11/1997 | Imase ......................... | 475/168 |
| 5,876,298 | A | * | 3/1999 | Kato et al. ................... | 475/162 |
| 6,280,359 | B1 | * | 8/2001 | Moskob .................. | 475/162 X |

FOREIGN PATENT DOCUMENTS

| | | | | |
|---|---|---|---|---|
| DE | 41 27 051 A | | 2/1993 | |
| GB | 2 307 964 A | | 6/1997 | |
| JP | 4-331850 | * | 11/1992 | ................. 475/112 |
| JP | 6-109084 | * | 4/1994 | ................. 475/116 |
| NL | 9 400 140 A | | 9/1995 | |

* cited by examiner

Primary Examiner—Charles A Marmor
Assistant Examiner—Roger Pang
(74) Attorney, Agent, or Firm—Michael J. Striker

(57) ABSTRACT

An eccentric gear wheel transmission has a rotational drive mechanism (3), an eccentric element (8), an eccentric wheel (10) rotatably supported on the eccentric element, and a slaving means (15), which cooperates with the eccentric wheel (10) by intermittently meshing with it. At least one guide pinion (25) cooperating with the eccentric wheel (10) is provided, which assures the eccentric motion of the eccentric wheel (10) and prevents an undesired rotation of the eccentric wheel (10).

7 Claims, 5 Drawing Sheets

ECCENTRIC TOOTHED GEARING

PRIOR ART

Figure 1:
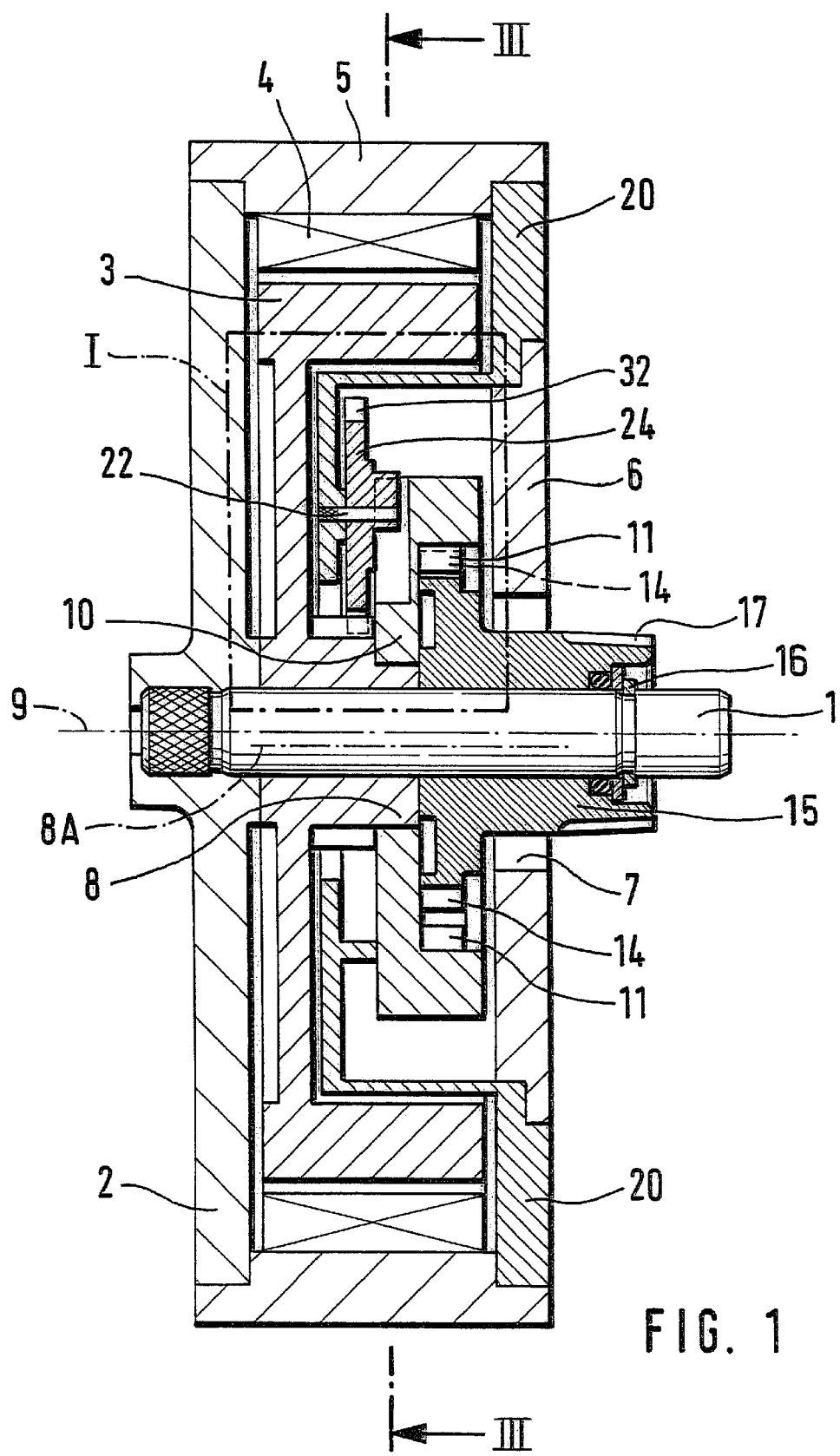

The invention relates to an eccentric gear wheel transmission for stepping up the rotary motion of adjusting motors. For reducing the rotary speed of adjusting motors, with an armature rotary speed of about 7000 rpm, worm gears are used as a rule. The worm gears used, which are driven by electric motors, are distinguished in that they have self-locking from the power takeoff side. Because of the requisite high gear ratio to attain adequate torques, for instance for driving window controls or a sliding roof in a motor vehicle, the external dimensions of an adjusting motor, comprising a motor and gears disposed side by side, are considerable. For this reason, eccentric gear wheel transmissions are used, which with very compact dimensions have self-locking and a simple design. Compared with the known worm gears, the eccentric gear wheel transmission is comparatively insensitive to tolerances, since all the rotating parts are supported on the same shaft.

An essential component of the eccentric gear wheel transmission is an eccentric wheel, which by its construction is capably of executing two different motions. One is rolling along a set of external teeth of a slaving means, which leads to a circular motion about a pivot point that is eccentric to the axis of the eccentric wheel, and the other is a rotation about itself. The rotation about itself is undesired, and in the known versions, it is prevented by guide elements on the eccentric wheel, which protrude into suitable recesses of a housing part connected solidly to the housing.

A disadvantage of this type of guidance is the major wear, caused by severe mechanical stress on the components involved in guiding the eccentric wheel, and the attendant short life of the eccentric gear wheel transmission, as well as the irritating noise produced by oscillating components.

ADVANTAGES OF THE INVENTION

The eccentric gear wheel transmission according to the invention having the characteristics of the main claim has the advantage that the guidance of the eccentric wheel is improved substantially. By means of the guide pinion cooperating with the eccentric wheel and assuring the circular motion of the eccentric wheel and preventing undesired rotation of the eccentric wheel, the mechanical stress on the components involved in guiding the eccentric wheel is reduced sharply. Furthermore, especially quiet operation of the eccentric gear wheel transmission is achieved, and the transmission can withstand substantially heavier loads, and mechanical wear is far less in comparison to conventional gears.

By means of the characteristics recited in the dependent claims, advantageous refinements of the eccentric gear wheel transmission defined by the main claim are possible.

If instead of the one guide pinion, a plurality of guide pinions disposed symmetrically about the eccentric wheel are used, then the active forces and thus the mechanical stress are distributed uniformly. It is for instance conceivable for two to three guide pinions to be disposed around the eccentric wheel, offset by 180° or 120° from one another as applicable.

The advantageous guidance of the eccentric wheel is attained by means of a guide pinion eccentric element, disposed on the guide pinion, that engages an oblong slot of the eccentric wheel. The eccentric element of the guide pinion can move back and forth in this oblong slot of the eccentric wheel and can thus receive one of two linear motion components of the circular motion of the eccentric wheel.

If the guide pinion has a set of external teeth that meshes with a set of external teeth of the rotational drive mechanism, then the motion of the eccentric wheel and the guide pinion are automatically synchronized which is a further advantage.

One condition for the guidance according to the invention of the eccentric wheel is that the eccentricity of the eccentric element of the guide pinion correspond to the eccentricity of the eccentric element that is connected to the eccentric wheel. This creates a precondition for preventing torsion of the eccentric wheel.

The disposition of the guide pinion relative to the eccentric wheel should also be done such that the center point of the eccentric element and the center point of the eccentric element of the guide pinion, regardless of the position of the rotational drive mechanism, are located on a line that extends parallel to a line through the shaft of the rotational drive mechanism and to a pin connected to the guide pinion. This meets a further condition so that the eccentric wheel is secured against torsion yet can be kept unhindered in terms of its eccentric motion. Thus the force transmission from an electric motor to a power takeoff pinion is also assured.

It is especially advantageous if the guide pinion is rotatably connected to a pin that protrudes into a transmission housing part and is solidly connected to it. This pin can be integrally formed onto the transmission housing part, and the guide pinion is simply mounted on this pin during assembly.

DRAWING

In the drawing, two exemplary embodiments of an eccentric gear wheel transmission according to the invention are shown and explained in further detail in the ensuing description.

Figure 2:
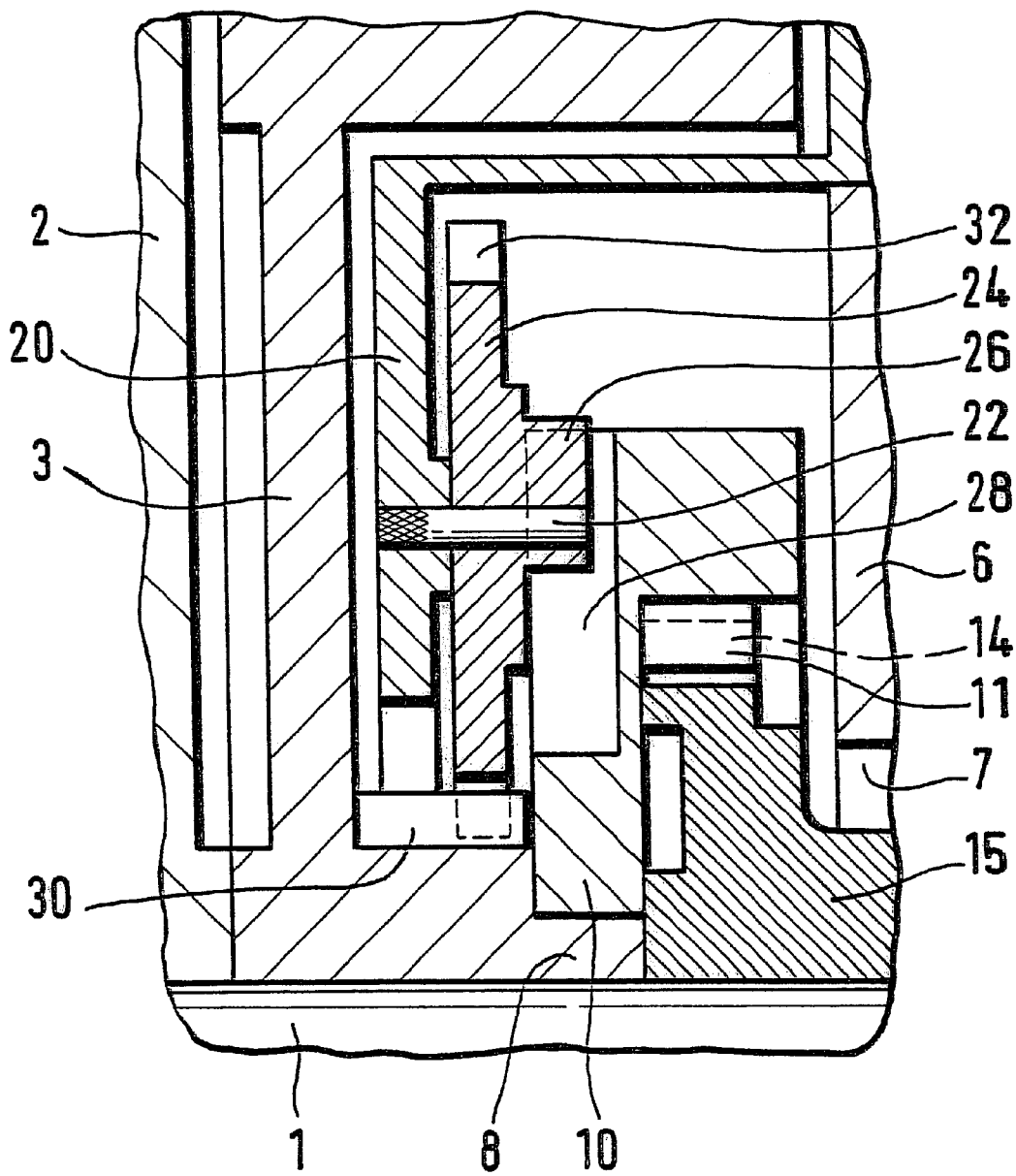
Figure 3:
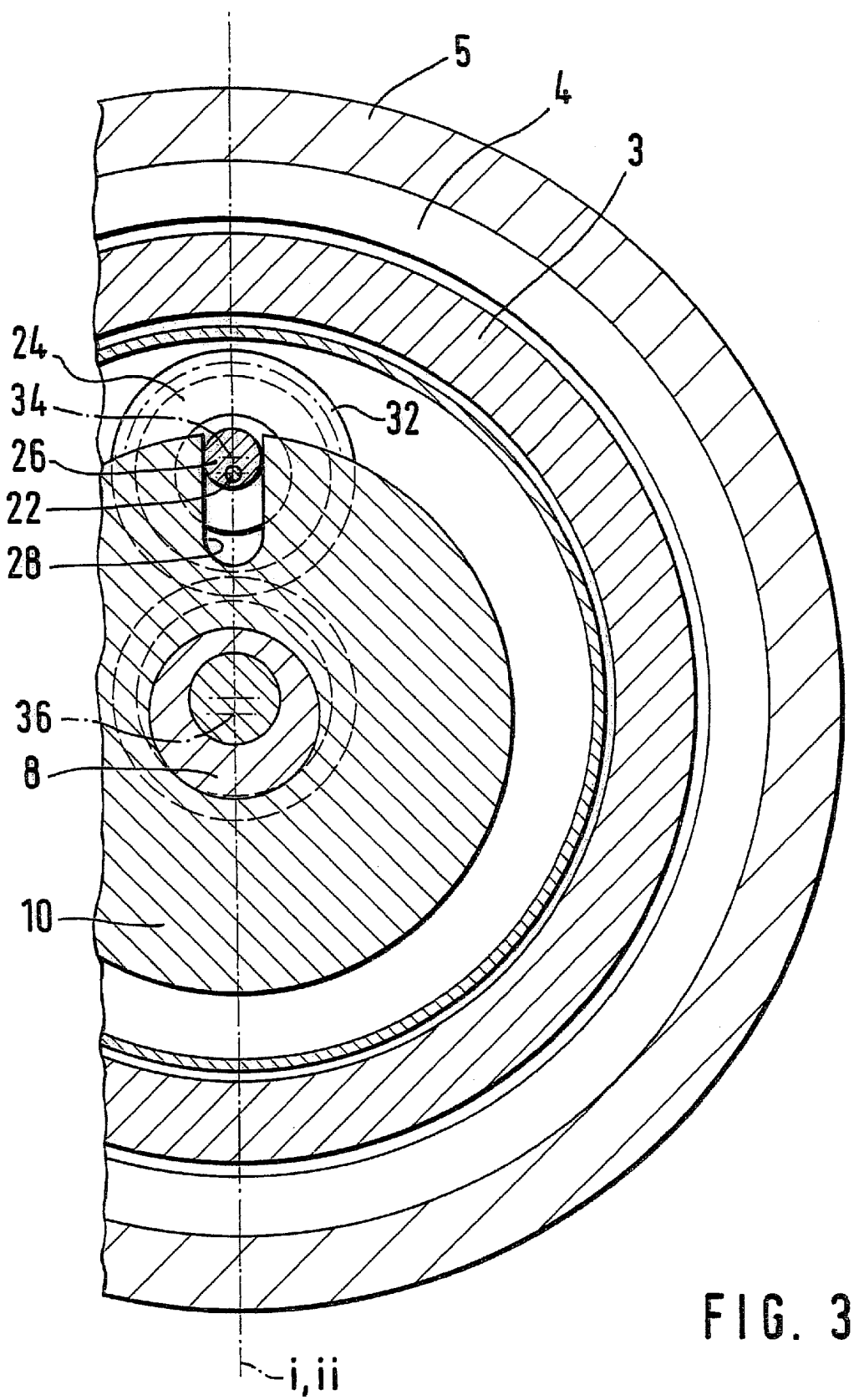
Figure 4:
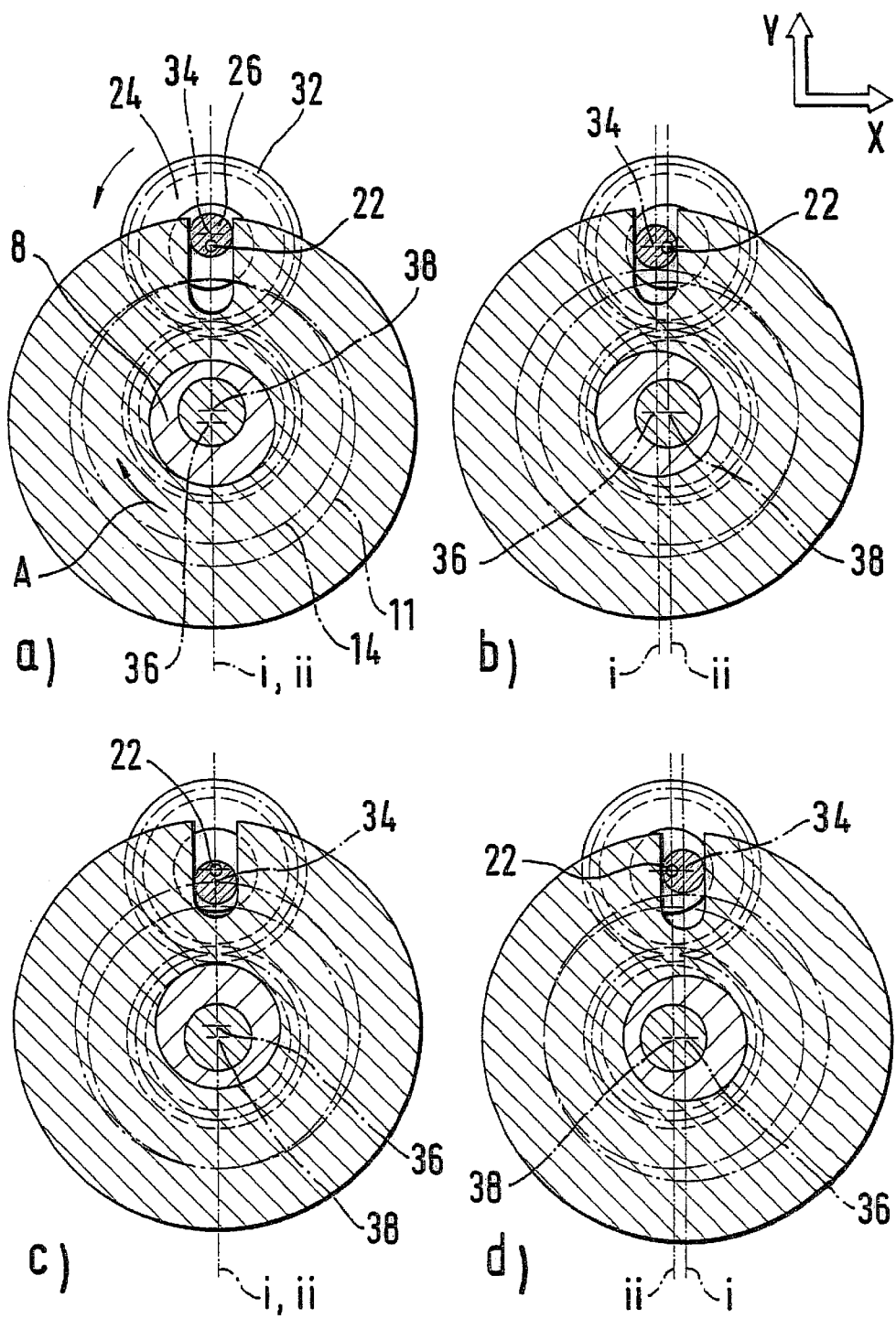

Shown are:

FIG. 1, an eccentric gear wheel transmission in longitudinal section;

FIG. 2, the enlarged region I of FIG. 1;

FIG. 3, a plan view along the line III—III of FIG. 1 in a fragmentary view;

FIG. 4, an illustration of various (a–d) operating states; and

Figure 5:
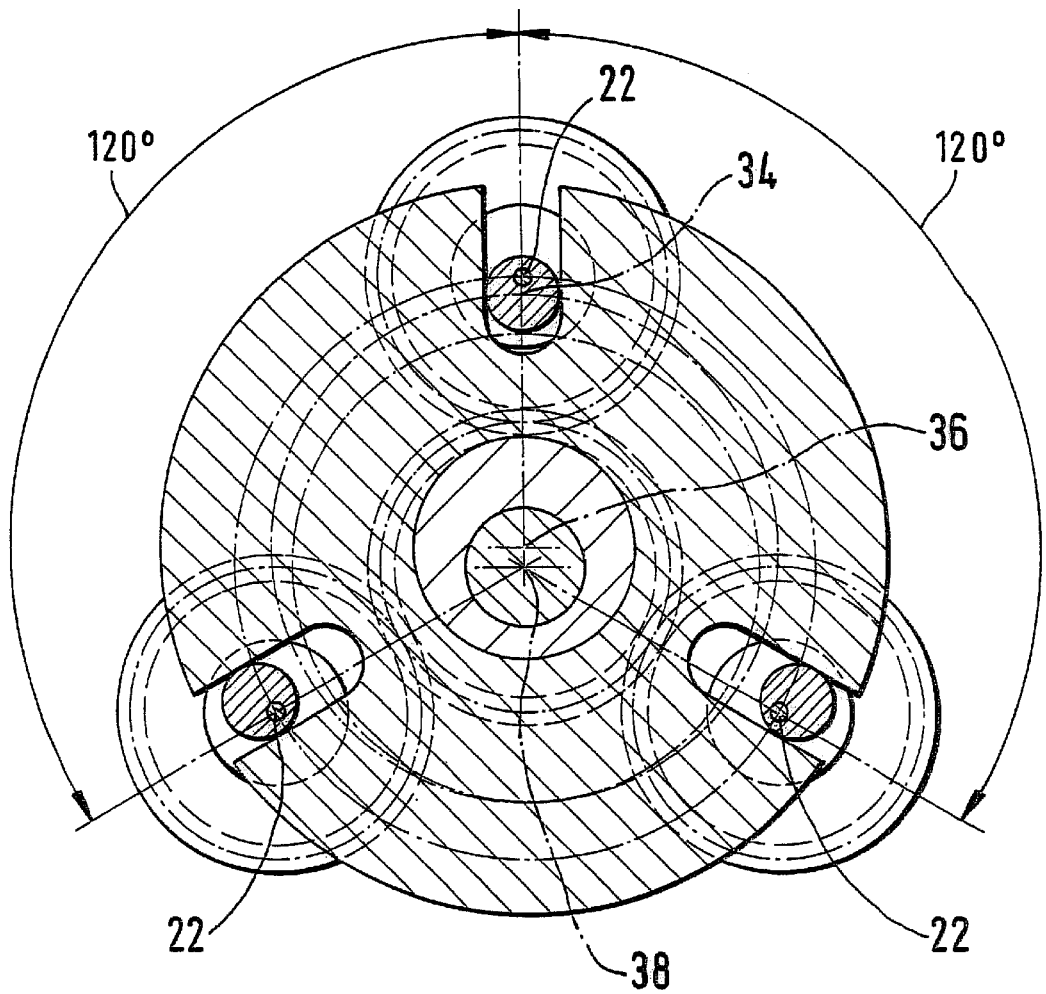

FIG. 5, a second exemplary embodiment, shown analogously to FIG. 3.

DESCRIPTION OF THE EXEMPLARY EMBODIMENTS

The first exemplary embodiment shown in FIG. 1 shows an electric motor with an eccentric gear wheel transmission, which has a shaft 1 that is secured in a housing bottom 2 in a manner fixed against relative rotation. A rotational drive mechanism in the form of an armature 3 is rotatably disposed on the shaft 1 and is driven by coils 4 of the electric motor. The coils 4 are disposed on the inside of a cylindrical housing portion 5, and the housing bottom 2 is also secured to the housing portion 5. On the side of the housing portion 5 opposite the housing bottom 2, a housing part 6 in the form of a cap with a central opening 7 is mounted solidly. Protruding through this central opening 7 is the end of the shaft 1 remote from the housing bottom 2. The housing portion 5, housing bottom 2 and cap 6 form a motor housing, in whose interior the armature 3 rotatable on the shaft 1 is disposed, and which is provided with an eccentric element 8, extending axially along the center axis 9 and having its own axis 8A. An eccentric wheel 10 is rotatably supported on the eccentric element 8 and is provided with a set of internal teeth 11.

The set of internal teeth 11 of the eccentric wheel 10 meshes intermittently with a set of external teeth 14 of a slaving means 15 that is rotatably supported on the shaft 1 and is axially secured by fastening means 16. The slaving means 15 protrudes through the housing part 6 out of the motor housing, and in this region, for the gear output is provided with a further set of external teeth 17.

On a transmission housing part 20 which separates the motor region from the gear region, a guide pinion 24 is rotatably disposed via a pin 22 that is joined solidly to the gear housing 20. The guide pinion 24 has an eccentric element 26, which protrudes into an oblong slot 28 of the eccentric wheel 10. The eccentric element of the guide pinion further has a set of external teeth 32, which meshes with a set of external teeth 30 of the armature 3.

A characteristic of the eccentric gear wheel transmission shown in FIG. 1 is its extremely shallow design, which is made possible by integrating the actual gear into the available installation space of the drive mechanism.

The characteristics that pertain to the guide pinion 24 are shown again, for the sake of greater clarity, in an enlarged view in FIG. 2. In FIG. 2, as in all the other drawings, the same characteristics are identified by the same reference numerals.

FIG. 3 shows a plan view on the exemplary embodiment of an eccentric gear wheel transmission according to the invention in fragmentary form, and here the guidance of the eccentric element 26 of the guide pinion in the oblong slot 28 of the eccentric wheel 10 can be seen especially well, but no further new characteristics are shown.

For the sake of better comprehension of the eccentric gear wheel transmission of the invention, the mode of operation of such a gear will now be explained again briefly. By means of the magnetic field induced in the coils 4, the armature 3 rotates about the shaft 1, which is connected to the housing bottom 2 in a manner fixed against relative rotation. As a result of the rotation of the armature 3, the eccentric element 8 also rotates about the shaft 1.

The eccentric wheel 10 rotatably supported on the eccentric element 8 would roll with its set of internal teeth 11 along the set of external teeth 14 of the slaving means 15, but itself—because of the guidance of the guide pinion 24—cannot execute any rotation about itself. Thus the slaving means 15, also rotatably connected to the shaft 1, rolls with its teeth 14 along the set of internal teeth 11. As a result of this rolling of the slaving means 15 in the eccentric wheel 10, a stepping down in the rotary motion of the slaving means 15 is attained, and this stepping down is carried onward via the set of external teeth 17 of the slaving means 15.

The eccentric wheel 10 consequently executes a circular motion, which is permitted by the guide pinion 24 since on the one hand it is guided in the oblong slot 28 of the eccentric wheel 10, and on the other the eccentricity of the eccentric element 26 of the guide pinion corresponds to that of the eccentric element 8. By the coupling of the guide pinion 24 and armature 3 via two identical sets of external teeth 30 and 32 and the defined assembly of the guide pinion, the two eccentric elements 8 and 26 run contrary to one another, and the two center points 34 and 36 of the respective eccentric elements are always located—as shown in FIG. 4—on a line i that extends parallel to second line ii through the shaft of the rotational drive mechanism and through the pin 22.

As a result of the interplay of these characteristics, the eccentric wheel 10 does rotate, but does not twist.

In FIGS. 4a–4c, four different operating positions of the eccentric gear wheel transmission are again shown. The set of internal teeth 11 rolls along the set of external teeth 14 in the direction of the arrow A, and the guide pinion 24 moves in the opposite direction. The two center points 34 and 36, of the eccentric element 26 of the guide pinion and of the eccentric element 8, respectively, are located in every operating position on the line i, which shifts back and forth along the X axis and is always parallel to the line ii. The eccentric element 26 of the guide pinion moves in the oblong slot 28 back and forth along the Y axis. These two linear motion components in the X and Y directions, together, result in the circular motion of the eccentric wheel 10, which assures a uniform power takeoff of the slaving means 15. The guidance of the eccentric element of the guide pinion in the oblong slot 28, however, prevents undesired torsion of the eccentric wheel 10.

In FIG. 5, a second exemplary embodiment of an eccentric gear wheel transmission according to the invention is shown, in which three guide pinions are disposed, offset from one another by 120° each. This changes nothing in terms of the fundamental mode of operation, but in this second variant it is advantageous that the incident forces are more uniformly distributed, and the power takeoff motion at the slaving means 15 is more uniform.

What is claimed is:

1. An eccentric gear wheel transmission, having a rotational drive mechanism (3), an eccentric element (8), an eccentric wheel (10) rotatably supported on the eccentric element, and a slaving means (15), which cooperates with the eccentric wheel (10) by intermittently meshing with it, characterized in that at least one guide pinion (24) cooperating with the eccentric wheel (10) is provided, wherein said at least one guide pinion (24) is coupled to an armature (3) of said rotational drive mechanism (3), which assures the eccentric motion of the eccentric wheel (10) and prevents an undesired rotation of the eccentric wheel (10).

2. An eccentric gear wheel transmission, having a rotational drive mechanism (3), an eccentric element (8), an eccentric wheel (10) rotatably supported on the eccentric element, and a slaving means (15), which cooperates with the eccentric wheel (10) by intermittently meshing with it, characterized in that at least one guide pinion (24) cooperating with the eccentric wheel (10) is provided, which assures the eccentric motion of the eccentric wheel (10) and prevents an undesired rotation of the eccentric wheel (10), and wherein the at least one guide pinion (24) has an eccentric element (26), which engages a slotted hole (28) of the eccentric wheel (10).

3. The eccentric wheel transmission of claim 2, characterized in that a plurality of guide pinions (24) are disposed symmetrically around the eccentric wheel (10).

4. The eccentric gear wheel transmission of claim 2, characterized in that the center point (36) of the eccentric element (8) and the center point (34) of an eccentric element (26) of the guide pinion, regardless of the position of the rotational drive mechanism (3), are located on a line (i) that extends parallel to a line (ii) through a shaft (1) of the rotational drive mechanism (3) and through a pin (22).

5. The eccentric gear wheel transmission of claim 2, characterized in that the at least one guide pinion (24) is connected rotatably to a pin (22), which is anchored in a transmission housing part (20).

6. An eccentric gear wheel transmission, having a rotational drive mechanism (3), an eccentric element (8), an eccentric wheel (10) rotatably supported on the eccentric element, and a slaving means (15), which cooperates with the eccentric wheel (10) by intermittently meshing with it, characterized in that at least one guide pinion (24) cooperating with the eccentric wheel (10) is provided, which assures the eccentric motion of the eccentric wheel (10) and prevents an undesired rotation of the eccentric wheel (10), wherein the at least one guide pinion (24) has an eccentric element (26), which engages a slotted hole (28) of the eccentric wheel (10), and wherein the eccentricity of the guide pinion corresponds to the eccentricity of the eccentric element (8).

7. An eccentric gear wheel transmission, having a rotational drive mechanism (3), an eccentric element (8), an eccentric wheel (10) rotatably supported on the eccentric element, and a slaving means (15), which cooperates with the eccentric wheel (10) by intermittently meshing with it, characterized in that at least one guide pinion (24) cooperating with the eccentric wheel (10) is provided, which assures the eccentric motion of the eccentric wheel (10) and prevents an undesired rotation of the eccentric wheel (10), wherein the at least one guide pinion (24) has an eccentric element (26), which engages a slotted hole (28) of the eccentric wheel (10), wherein the eccentricity of the guide pinion corresponds to the eccentricity of the eccentric element (8), and wherein the at least one guide pinion (24) has a set of external teeth (32), which meshes with a set of external teeth (30) of the rotational drive mechanism.

* * * * *